United States Patent [19]

Kawashima et al.

[11] Patent Number: 4,981,249
[45] Date of Patent: Jan. 1, 1991

[54] AUTOMATIC JET SOLDERING APPARATUS

[75] Inventors: Yasuji Kawashima, Ibaraki; Kazuo Nishibori, Toyonaka; Yasuhiro Morita, Nagaokakyo; Sachiho Hayama, Osaka, all of Japan

[73] Assignee: Matsushita Electric Industrial Co., Ltd., Osaka, Japan

[21] Appl. No.: 400,605

[22] Filed: Aug. 30, 1989

[30] Foreign Application Priority Data

Aug. 31, 1988 [JP] Japan ................. 63-216603
Sep. 13, 1988 [JP] Japan ................. 63-229125

[51] Int. Cl.$^5$ ............................................. B23K 3/06
[52] U.S. Cl. ................................... 228/37; 228/43
[58] Field of Search ............... 228/34, 37, 256, 260, 228/261, 43, 561; 118/429

[56] References Cited

U.S. PATENT DOCUMENTS 4,465,219  8/1984  Kondo ...................... 228/37
4,666,077  5/1987  Rahn et al. ................ 228/37

FOREIGN PATENT DOCUMENTS 1225947  9/1966  Fed. Rep. of Germany ...... 228/37
 199065  8/1988  Japan ..................... 228/37
1498605  1/1978  United Kingdom .

Primary Examiner—Sam Heinrich
Attorney, Agent, or Firm—Panitch Schwarze Jacobs & Nadel

[57] ABSTRACT

An automatic jet soldering apparatus comprising: a solder bath for holding molten solder therein; a nozzle body having an open top and an open bottom through which the molten solder rises from the solder bath; a punched panel having numerous holes and disposed inside of the nozzle body in such a way to be opened and closed; and a jet source connected to the lower part of the nozzle body, the molten solder rising upward through the nozzle body via the open bottom and the open top of the nozzle body by means of jet power from the jet source. The soldering apparatus further comprises a back rectifying plate mounted on the rear portion of the top opening of the nozzle body, the sloping angle of the back rectifying plate being adjustable, thereby attaining an easy removal of solder residues from the punched panel and achieving a zero relative speed between a printed circuit board and the solder flow velocity, so that the reliability of soldering can be enhanced.

7 Claims, 6 Drawing Sheets

FIG. 3A PRIOR ART
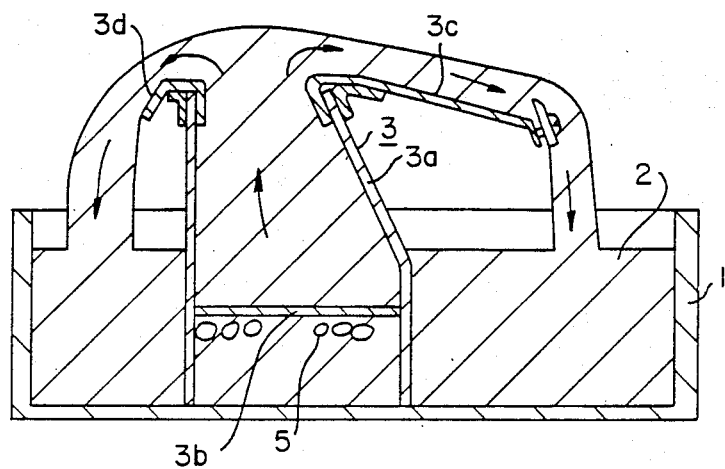
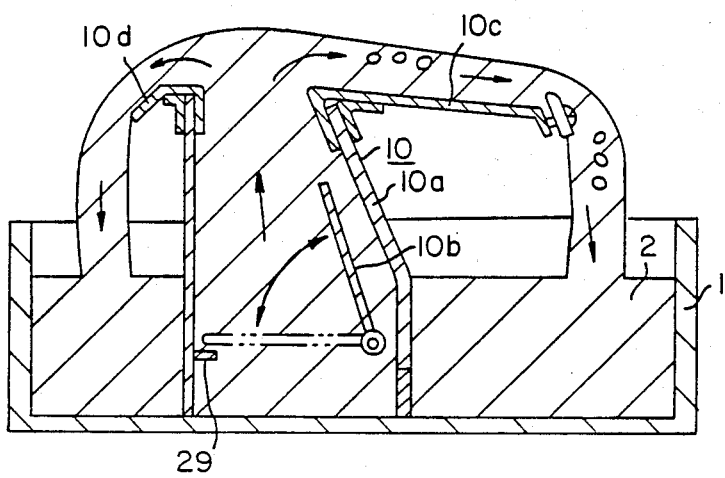
FIG. 3B

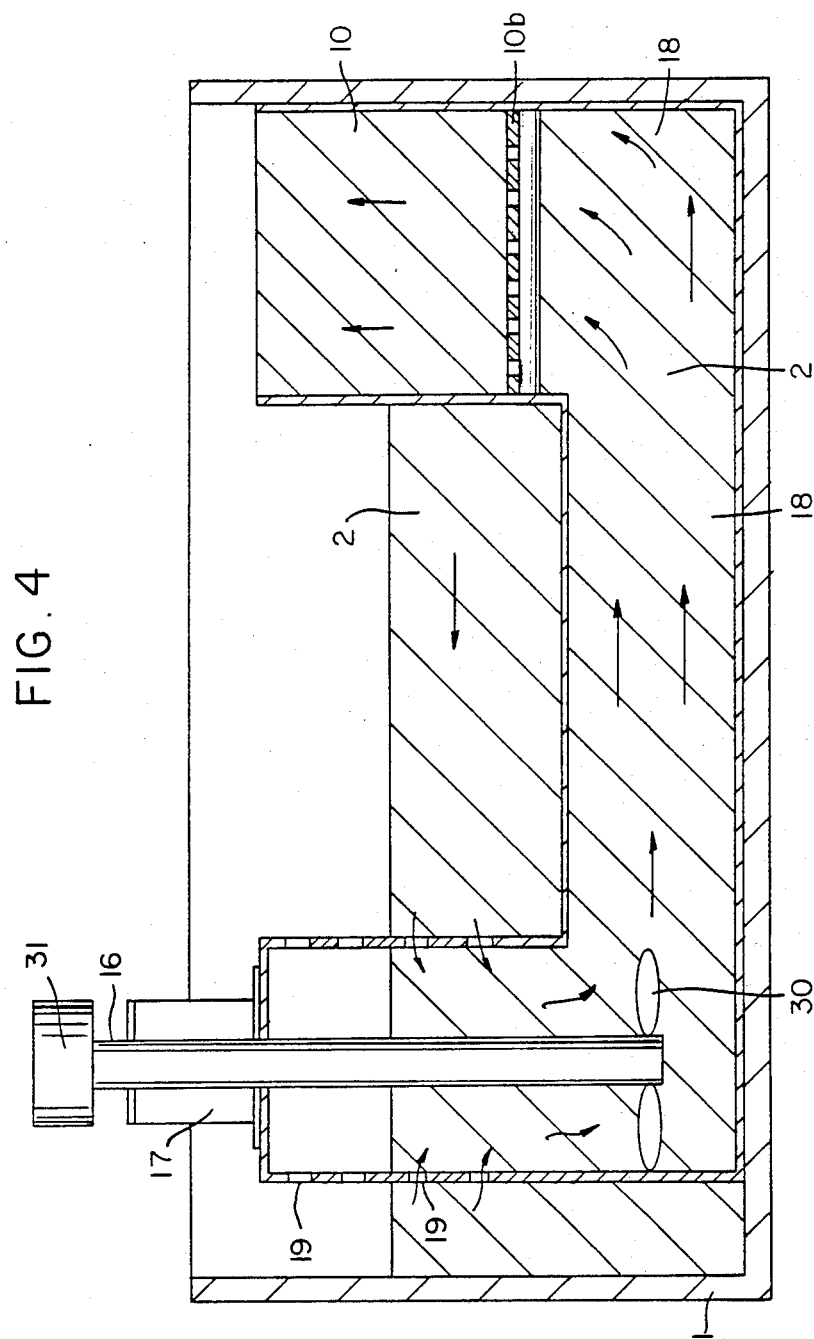

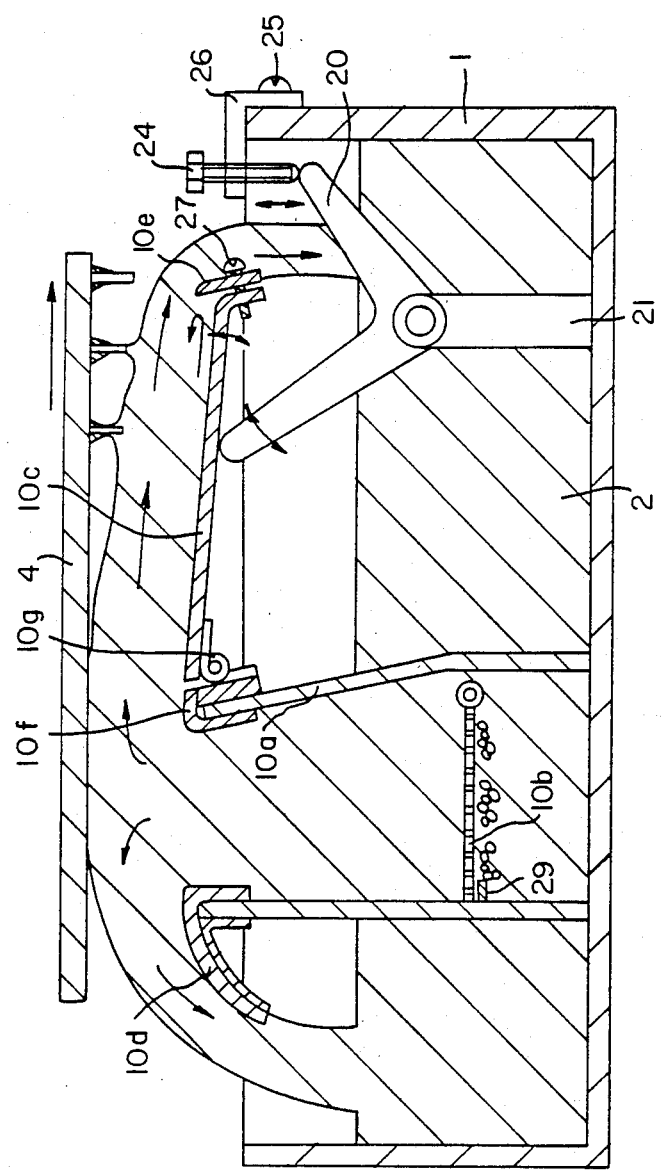

AUTOMATIC JET SOLDERING APPARATUS

BACKGROUND OF THE INVENTION

1. Field of the Invention:

The present invention relates to an automatic jet soldering apparatus that can be used for soldering electronic components to a printed circuit board.

2. Description of the Prior Art:

There has been a jet soldering apparatus by which resistors, capacitors, jumper wires, etc. are soldered to a printed circuit board.

The following description deals with the construction and functions of such a conventional soldering apparatus with reference to FIG. 1, wherein a solder bath 1 contains molten solder 2 therein. A nozzle 3 is disposed within the solder bath 1. The nozzle 3 comprises a nozzle body 3a having an open top and an open bottom, and a punched panel 3b having numerous holes through which the molten solder 2 passes and fixed in the lower part of the nozzle body 3a, the punched panel 3b serving to determine the wave height H of the molten solder 2. The nozzle 3 further comprises a back rectifying plate 3c fitted onto the rear portion of the top end of the nozzle body 3a, and a front rectifying plate 3d fitted onto the forward portion of the top end of the nozzle body 3a. The nozzle 3 is connected by a duct (not shown) to a jet source (not shown) having a propeller, the rotation of the propeller causing the molten solder 2 to flow upward through the nozzle body 3a and then along the back rectifying plate 3c and the front rectifying plate 3d to return to the solder bath 1. A printed circuit board 4 is conveyed in the arrow direction (rearward) by means of a belt conveyer or other conveying means, and above the nozzle 3 on the way, the solder side of the printed circuit board 4 is brought in contact with the molten solder 2 for the soldering of resistors and other components. The printed circuit board is conveyed at the same speed as the flow velocity of the molten solder 2 (the solder flow velocity along the back rectifying plate 3c), that is, the conveying speed of the printed circuit board 4 relative to the solder flow velocity becomes zero to create a condition equivalent to static soldering, thus providing highly reliable automatic soldering.

The above construction, however, has the problem that solder residues 5 build up with use on the underside of the punched panel 3b to eventually block the holes provided in the punched panel 3b, which causes turbulence in the wave height H of the solder jet. When such turbulence is caused in the wave height H of the solder jet, the solder cannot be securely applied to the entire surface of the printed circuit board, thus affecting product quality as a result.

To eliminate the above-mentioned problem, it is currently practiced to remove the nozzle 3 from the solder bath 1 for cleaning solder residues from the punched panel 3b. However, since the nozzle 3 is removed from the solder bath 1 having a high temperature of about 250° C., it is not possible to clean the nozzle 3 immediately after removal, and also, cleaning work itself consumes time and labor, which are disadvantages with the construction of such a conventional soldering apparatus.

On the other hand, in the relationship between the flow velocity of the molten solder 2 and the conveying speed of the printed circuit board 4, if the flow velocity of the molten solder 2 is, for example, faster than the conveying speed of the printed circuit board 4, solder will be torn off because of the strong pull of the molten solder 2 on a terminal 4a at the point where the terminal 4a leaves the molten solder 2. This means an increased amount of deposition of the molten solder 2 on the terminal 4a, which brings a problem of the creation of a solder bridge to adjacent terminals. Particularly in printed circuit boards for which higher component density is needed, the spacing between adjacent terminals is becoming increasingly smaller, and a preventive measure against solder bridging is much in need. As an example of such a measure, it is possible to control the solder flow along the back and front rectifying plates 3c and 3d by regulating the rotating speed of the jet source, or to control the conveying speed of the printed circuit board 4. However, when the rotating speed of the jet source is reduced, there arises a problem that the swelling (wave height H) of the molten solder 2 from the nozzle 3 is insufficient, preventing the full contact of the molten solder 2 with the solder side of the printed circuit board 4. Conversely, when the rotating speed of the jet source is increased, there arises a problem that the wave height H of the molten solder 2 becomes excessively high, causing the molten solder 2 to reach the component side of the printed circuit board 4 with a resultant trouble in practical use. It is therefore desired to keep a consistent wave height H of the molten solder 2. On the other hand, it is also desired to keep a consistent conveying speed of the printed circuit board 4 from the viewpoint of production efficiency. Therefore, it has been extremely difficult with the construction of the conventional soldering apparatus to achieve a zero relative speed between the printed circuit board 4 and the solder flow velocity.

SUMMARY OF THE INVENTION

The automatic jet soldering apparatus of the present invention, which overcomes the above-discussed and numerous other disadvantages and deficiencies of the prior art, comprises a solder bath for holding molten solder therein; a nozzle body having an open top and an open bottom through which the molten solder rises from the solder bath; a punched panel having numerous holes and disposed inside of the nozzle body in such a way to be opened and closed; and a jet source connected to the lower part of the nozzle body, said molten solder rising upward through said nozzle body via said open bottom and said open top of said nozzle body by means of jet power from said jet source.

In a preferred embodiment, the automatic jet soldering apparatus further comprises an open/close lever fixed to a rotation shaft of the punched panel and a fixing hook which catches the open/close lever with the punched panel in the closed position to lock the punched panel in the closed position. The punching panel is opened upright along an inner wall of the nozzle body for removal of solder residues, said solder residues being removed from said punching panel by molten solder flowing upward through said nozzle body.

In a preferred embodiment, the automatic jet soldering apparatus further comprises a back rectifying plate mounted on the rear portion of the top opening of the nozzle body, the sloping angle of said back rectifying plate being adjustable.

In a preferred embodiment, the automatic jet soldering apparatus further comprises a back rectifying plate mounted on the rear portion of the top opening of the nozzle body, the sloping angle of said back rectifying plate being adjustable; and a flow velocity adjusting plate attached vertically to the edge of the back rectifying plate in such a way as to obstruct the flow of the molten solder falling off the back rectifying plate. The back rectifying plate is swingably mounted on the rear portion of the top opening of the nozzle body by means of a hinge.

In a preferred embodiment, the automatic jet soldering apparatus further comprises a slope angle adjusting lever that is swingably supported within said solder bath one end of said adjusting lever abutting against the underside of the back rectifying plate and the other end thereof abutting against an adjusting screw that threads through a mounting plate, and said adjusting screw being adjustable to regulate the sloping angle of said back rectifying plate by means of said adjusting lever.

According to the present invention, the punched panel is disposed in the nozzle body in such a way as to be opened and closed, and the punched panel is opened upright along an inner wall of the nozzle body for removal of solder residues, the solder residues being removed from the punched panel by molten solder flowing upward through the nozzle body, thus making it extremely easy to clean the punched panel.

Moreover, according to the present invention, since the sloping angle of the back rectifying plate is made adjustable, and since the degree of projection of the flow velocity adjusting plate is also adjustable, it is possible to readily control the velocity of the solder flowing along the back rectifying plate while keeping constant both the wave height of the solder and the conveying speed of the printed circuit board, thereby achieving a zero relative speed between the printed circuit board and the solder flow velocity.

Thus, the invention described herein makes possible the objectives of (1) providing an automatic jet soldering apparatus wherein solder residues can be readily removed from a punched panel; and (2) providing a nozzle of an improved construction for achieving a zero relative speed between a printed circuit board and the solder flow velocity, thereby enhancing the reliability of soldering.

BRIEF DESCRIPTION OF THE DRAWINGS

This invention may be better understood and its numerous objects and advantages will become apparent to those skilled in the art by reference to the accompanying drawings as follows:

FIGS. 3A and 3B, respectively, are cross sectional views showing the main portion of the conventional apparatus and an apparatus of the present invention for comparison purposes.

FIG. 4 is a cross sectional view showing the main portion of the automatic jet soldering apparatus of FIG. 2.

FIG. 5 is a cross sectional view showing the main portion of another automatic jet soldering apparatus of the present invention.

DESCRIPTION OF THE PREFERRED EMBODIMENTS

The present invention provides an automatic jet soldering apparatus for soldering electronic component leads to the pattern on a printed circuit board on which electronic components are mounted and which is conveyed over a nozzle body disposed in a solder bath, molten solder rising upward through the nozzle body; wherein a punched panel for determining the wave height of solder jet is disposed inside of the nozzle body in such a way as to be opened and closed (or rotatably) for easy removal of solder residues deposited on the underside of the punched panel. Also, a rectifying plate for serving to determine the flow velocity of molten solder is mounted on the upper end of the nozzle body, the sloping angle of the rectifying plate being readily adjustable for controlling the velocity of the molten solder flowing on the rectifying plate at the same speed as the conveying speed of the printed circuit board, to create a condition equivalent to static soldering, thus providing automatic soldering of high quality.

EXAMPLE 1

Figure 2:
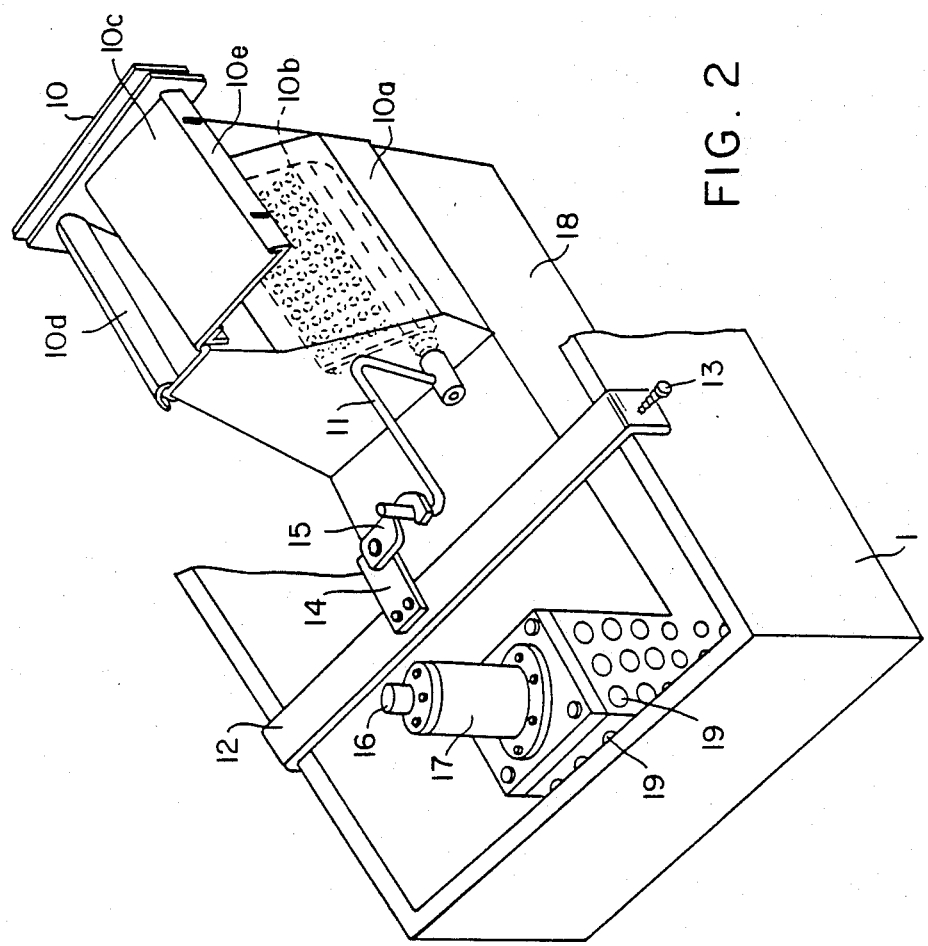
FIG. 2 is a perspective view showing an automatic jet soldering apparatus of the present invention.

FIGS. 2 and 4 show an automatic soldering apparatus of the present invention, which comprises a solder bath 1 that holds molten solder 2 therein and a nozzle 10 that is disposed within the solder bath 1. The nozzle 10 comprises a nozzle body 10a having an open top and an open bottom, a punched panel 10b disposed nearer to the larger opening in the lower part of the nozzle body 10a in such a way as to be opened and closed. The nozzle 10 further comprises a front rectifying plate 10d and a back rectifying plate 10c, both of which are detachably mounted on the smaller opening in the upper part of the nozzle body 10a. The punched panel 10b, which is planar in shape, is provided with numerous holes through which the molten solder 2 passes, and also with a rotation shaft on one side thereof. The rotation shaft is fitted into holes provided in the walls of the nozzle body 10a corresponding thereto, the rotation shaft being used to open and close or rotate the punched panel 10b. Fixed to one end of the rotation shaft projecting from one of the walls of the nozzle body 10a is a lever 11 of the shape and length to match a conveying means for printed circuit boards. A mounting bracket 12 that is capable of positional adjustment is mounted on the solder bath 1 with a screw 13. A rotation support 14 is fixed to the mounting bracket 12. On the rotation support 14, a fixing hook 15 is rotatably mounted, the fixing hook 15 catching the end portion of the open-/close lever 11 to lock the punched panel 10b in the closed position. A duct 18 connects a rotation shaft 16 and a bearing 17 to the nozzle 10. Connected to the rotation shaft 16 is a propeller 30 positioned inside the duct 18, the driving power from a driving source 31 such as a motor being transmitted via the rotation shaft 16 to the propeller 30 by the rotation of which the molten solder 2 flowing through numerous holes 19 into the duct 18 is forced toward the nozzle 10.

The following describes operation of the automatic jet soldering apparatus.

Figure 1:
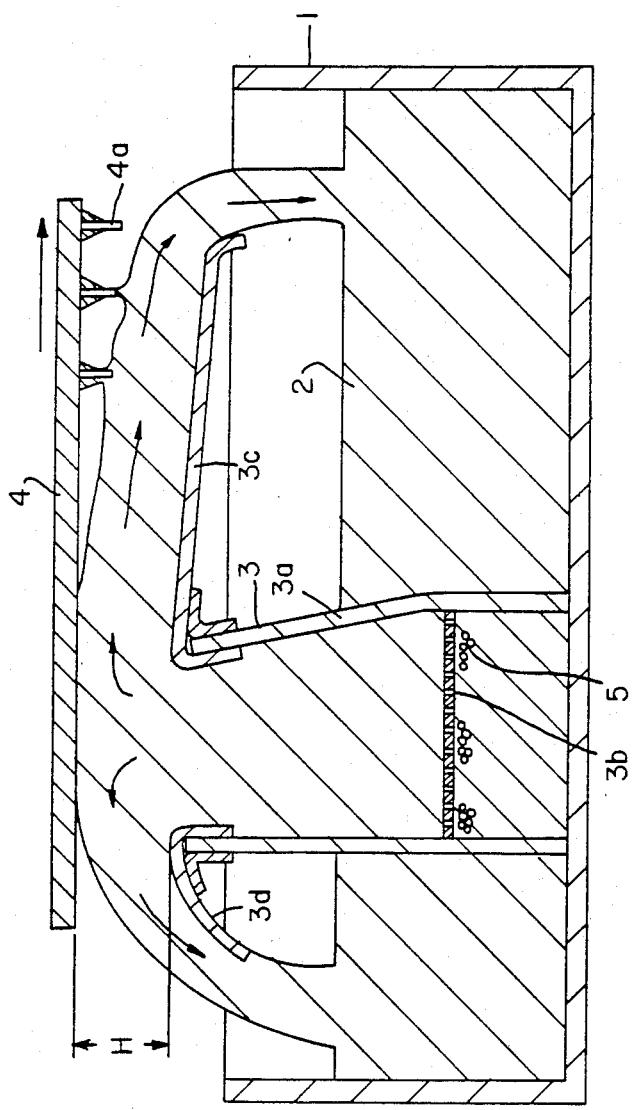
FIG. 1 is a cross sectional view showing the main portion of a conventional automatic jet soldering apparatus.

Prior to the operation of the soldering apparatus, the punched panel 10b is first placed in the closed position as shown by the two-dot chain line in FIG. 3B. That is, the punched panel 10b is so positioned as to close the bottom opening of the nozzle body 10a. At this time, the side of the punched panel 10b opposite from the side provided with the rotation shaft is supported on a supporting member 29 fixed to the nozzle body 10a. While in this state, the fixing hook 15 is made to catch one end of the open/close lever 11 to lock the punched panel 10b in the closed position so as not to be pushed open by the jetting of the molten solder 2. In this condition, a stable wave height H is maintained as in the case of the conventional apparatus, thus providing high quality soldering. A printed circuit board is not shown in FIG. 2, but the printed circuit board is conveyed over the solder bath 1 in the same manner as that shown in FIG. 1.

The punched panel 10b is opened upright along one inner wall of the nozzle body 10a, as shown in FIG. 3B, for removal of solder residues deposited on the underside of the punched panel 10b. To open the punched panel 10b, the open/close lever 11 is first disengaged from the fixing hook 15, and then operated to move the punched panel 10b to the open position. While in this state, the molten solder 2 is jetted upward in the arrow direction as shown in FIG. 3B, thus removing the solder residues deposited on the punched panel 10b by the jetting force. Since the removed solder residues come afloat on the surface of the molten solder 2, it is easy to remove them from the solder bath 1. If required, the open/close lever 11 can be used to apply vibration to the punched panel 10b for further effective removal of the solder residues. Also, the underside of the punched panel 10b can be cleaned using a rod-like tool (not shown). After removal of the solder residues, the punched panel 10b is placed back into the closed position, the open/close lever 11 being engaged with the fixing hook 15 to lock the punched panel 10b in position.

The above-mentioned construction has the advantage that the built-up solder residues can be removed from the punched panel 10b by operating the open/close lever 11 without removing the nozzle 10 from the solder bath 1 and with the nozzle 10 remaining immersed in the molten solder 2, thus facilitating the cleaning work. This also means prevention of build-up of solder residues on the punched panel 10b, which helps to maintain a stable wave height of the solder jet and, thus, assures trouble-free, high quality soldering.

EXAMPLE 2

Figure 6:
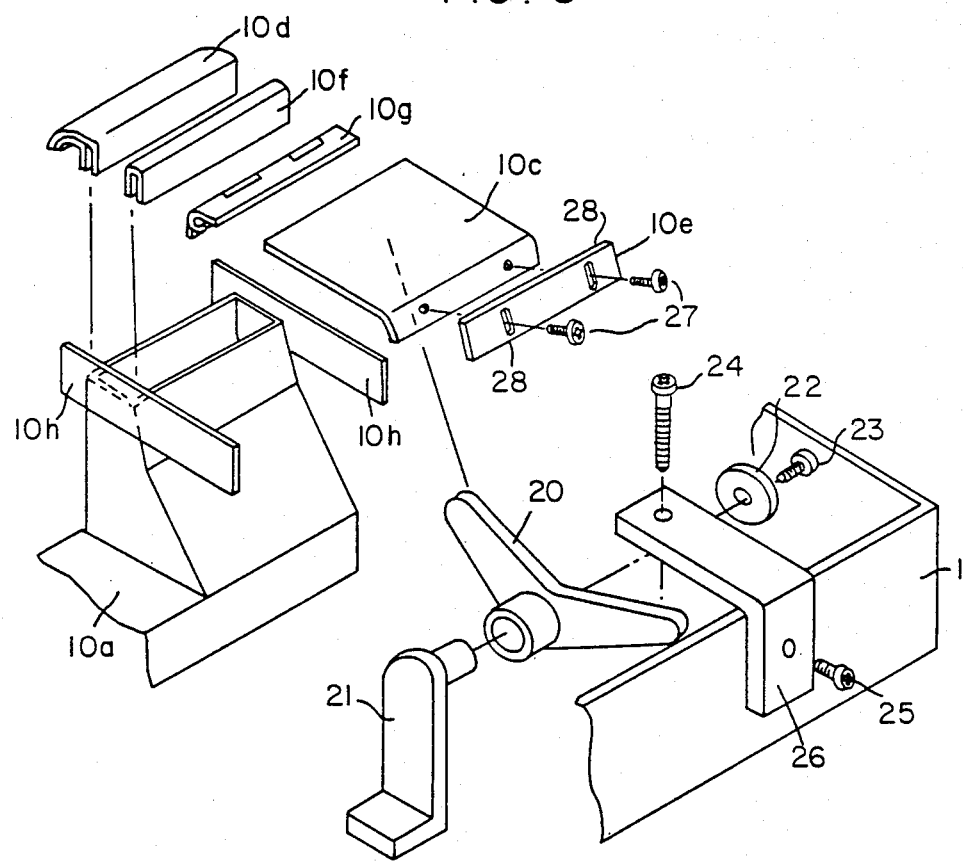
FIG. 6 is a decomposed perspective view showing another automatic jet soldering apparatus of the present invention.

Another embodiment of the present invention will now be described with reference to FIGS. 5 and 6. The reference numeral 1 indicates a solder bath, the numeral 2 molten solder, the numeral 10a a nozzle body, and the numeral 10b a punched panel, these components being the same as those shown in FIG. 2. A front rectifying plate 10d is fitted onto the upper end of the front wall in the top opening of the nozzle body 10a. An approximately U-shaped mounting bracket 10f for mounting a back rectifying plate 10c is fitted or, screwed as necessary, onto the upper end of the rear wall in the top opening of the nozzle body 10a. The back rectifying plate 10c is mounted to the back rectifying plate mounting bracket 10f using a hinge 10g. Thus, the angle of the back rectifying plate 10c is made readily adjustable. The reference numeral 20 indicates a lever for adjusting the angle of the back rectifying plate 10c, the lever being formed in an L shape and rotatably mounted at the bent portion on a support shaft base 21 fixed to the solder bath 1, using a collar 22 and a screw 23. An adjusting screw 24 functions to adjust the rotation angle of the adjusting lever 20, and thus, the angle of the back rectifying plate 10c, the adjusting screw 24 threading through an adjusting screw mounting plate 26 fixed to the solder bath 1 with a screw 25. The tip of the adjusting screw 24 abuts against the end of one arm of the adjusting lever 20, while the end of the other arm of the adjusting lever 20 abuts against the underside of the back rectifying plate 10c. A flow velocity adjusting plate 10e functions to adjust the velocity of the molten solder 2 flowing along the back rectifying plate 10c, the plate 10e being fixed to the bent edge portion of the back rectifying plate 10c using a plurality of screws 27. The flow velocity adjusting plate 10e projects in one direction in such a way as to obstruct the flow of the molten solder 2 falling off the back rectifying plate 10c, the degree of the projection being adjustable using elongated holes 28 provided in the flow velocity adjusting plate 10e.

Accordingly, with the above-mentioned construction, it is possible to adjust the sloping angle of the back rectifying plate 10c by swinging the adjusting lever 20 by tightening or loosening the adjusting screw 24. Also, by adjusting the degree of the projection of the flow velocity adjusting plate 10e from the main surface of the back rectifying plate 10c, it is possible to adjust the flow rate of the solder returning to the solder bath 1, which coupled with the adjustment of the sloping angle of the back rectifying plate 10c, allows a ready and accurate adjustment of the flow velocity of the molten solder 2 falling off the back rectifying plate 10c, thereby achieving a zero flow velocity relative to the conveying speed of the printed circuit board 4.

As a result, the molten solder 2 leaves a terminal 4a on the printed circuit board 4 without tearing off as was the case with the construction of the conventional apparatus. This means a lesser amount of deposition of the molten solder 2 on the terminal 4a than the construction shown in FIG. 3, thus providing less possibility of solder bridging being created between adjacent soldered terminals and therefore, assuring highly reliable soldering. Accordingly, the above-mentioned construction of the soldering apparatus of the present invention can be advantageously used for soldering of high component density printed circuit boards, enabling production of printed circuit boards of high quality.

Referring back to FIG. 6, the reference numeral 10h indicates a pair of guide plates mounted in such a way that their upper edges are positioned higher than the opening surface of the nozzle body 10a, thus helping further swelling of solder at both sides thereof for better soldering.

It is understood that various other modifications will be apparent to and can be readily made by those skilled in the art without departing from the scope and spirit of this invention. Accordingly, it is not intended that the scope of the claims appended hereto be limited to the description as set forth herein, but rather than the claims be construed as encompassing all the features of patentable novelty that reside in the present invention, including all features that would be treated as equivalents thereof by those skilled in the art to which this invention pertains.

What is claimed is:

1. An automatic jet soldering apparatus comprising:
   a solder bath for holding molten solder therein;
   a nozzle body having an open top and an open bottom through which the molten solder rises from the solder bath;

a punched panel having numerous holes and disposed inside of the nozzle body in such a way to be opened and closed; and a jet source connected to the lower part of the nozzle body, said molten solder rising upward through said nozzle body via said open bottom and said open top of said nozzle body by means of jet power from said jet source.

2. An automatic jet soldering apparatus as set forth in claim 1, which further comprises an open/close lever fixed to a rotation shaft of the punched panel and a fixing hook which catches the open/close lever with the punched panel in the closed position to lock the punched panel in the closed position.

3. An automatic jet soldering apparatus according to claim 1, wherein said punched panel is opened upright along an inner wall of the nozzle body for removal of solder residues, said solder residues being removed from said punched panel by molten solder flowing upward through said nozzle body.

4. An automatic jet soldering apparatus according to claim 1, which further comprises a back rectifying plate mounted on the rear portion of the top opening of the nozzle body, the sloping angle of said back rectifying plate being adjustable.

5. An automatic jet soldering apparatus according to claim 1, which further comprises a back rectifying plate mounted on the rear portion of the top opening of the nozzle body, the sloping angle of said back rectifying plate being adjustable; and a flow velocity adjusting plate attached vertically to the edge of the back rectifying plate in such a way as to obstruct the flow of the molten solder falling off the back rectifying plate.

6. An automatic jet soldering apparatus according to claim 5, wherein said back rectifying plate is swingably mounted on the rear portion of the top opening of the nozzle body by means of a hinge.

7. An automatic jet soldering apparatus according to claim 5, which further comprises a slope angle adjusting lever that is swingably supported within said solder bath one end of said adjusting lever abutting against the underside of the back rectifying plate and the other end thereof abutting against an adjusting screw that threads through a mounting plate, and said adjusting screw being adjustable to regulate the sloping angle of said back rectifying plate by means of said adjusting lever.

* * * * *